(12) United States Patent
Stasio

(10) Patent No.: US 7,207,294 B2
(45) Date of Patent: Apr. 24, 2007

(54) PET TOY

(76) Inventor: Annmarie Stasio, 36 Peter Rd., North Reading, MA (US) 01864

( * ) Notice: Subject to any disclaimer, the term of this patent is extended or adjusted under 35 U.S.C. 154(b) by 229 days.

(21) Appl. No.: 11/037,495

(22) Filed: Jan. 18, 2005

(65) Prior Publication Data

US 2006/0160465 A1    Jul. 20, 2006

(51) Int. Cl.
 *A01K 29/00* (2006.01)
(52) U.S. Cl. ............................................. 119/707
(58) Field of Classification Search ........ 119/702–711; 473/569, 575, 423–426, 506; 273/317.8; 2/239, 267, 19, DIG. 3, DIG. 10, 2, 88, 93, 2/29
See application file for complete search history.

(56) References Cited

U.S. PATENT DOCUMENTS

| | | | | |
|---|---|---|---|---|
| 1,081,037 A | * | 12/1913 | Hackh | 473/589 |
| 2,311,160 A | * | 2/1943 | Dobbelaar | 124/5 |
| 3,393,911 A | * | 7/1968 | Lawson | 473/576 |
| 3,862,757 A | * | 1/1975 | Craig, II | 473/575 |
| 4,127,268 A | * | 11/1978 | Lindgren | 473/576 |
| 4,133,296 A | * | 1/1979 | Smith | 119/709 |
| 4,373,215 A | * | 2/1983 | Guigley | 2/239 |
| 4,657,253 A | * | 4/1987 | Lerner et al. | 473/576 |
| 4,826,179 A | * | 5/1989 | Callaghan | 473/575 |
| 5,112,061 A | * | 5/1992 | Lamle | 473/473 |
| RE34,032 E | * | 8/1992 | Callaghan | 473/575 |
| D329,310 S | | 9/1992 | O'Rourke | |
| 5,215,038 A | | 6/1993 | O'Rourke | |
| D343,930 S | | 2/1994 | Garcia | |
| 5,310,194 A | * | 5/1994 | Scheel | 473/569 |
| D348,959 S | | 7/1994 | Lawson | |
| 5,329,640 A | | 7/1994 | Hourigan | |
| D371,645 S | | 7/1996 | Lawson | |
| D374,748 S | | 10/1996 | Plunk | |
| D382,382 S | | 8/1997 | Weinacker, Jr. | |
| 6,216,640 B1 | | 4/2001 | Zelinger | |
| D496,521 S | | 9/2004 | Tepper et al. | |

OTHER PUBLICATIONS

Petco.com, Product Details "Pooch Pleasers Knotted Tug Lambswool Dog Toy with Squeaker," [retrieved on Jan. 18, 2005]. Retrieved from Internet http://www.petco.com/product_info.asp?familyid=6060&sku=4258311293&tab=1&dept_i . . . .

* cited by examiner

*Primary Examiner*—Thomas Price
(74) *Attorney, Agent, or Firm*—Hamilton, Brook, Smith & Reynolds, PC

(57) ABSTRACT

In accordance with an embodiment of the invention, there is provided a toy for a pet. The toy includes a tube-shaped member comprising at least two layers of soft durable fabric, and comprising tube ends that are unfrayed, wherein at least one of the tube ends is open; and at least one knot formed in the tube-shaped member. In another embodiment according to the invention, there is provided a method of manufacturing a toy for a pet. The method includes forming a tube-shaped member comprising at least two layers of soft durable fabric, and comprising tube ends that are unfrayed, wherein at least one of the tube ends is open; and forming at least one knot in the tube-shaped member.

16 Claims, 5 Drawing Sheets

PET TOY

BACKGROUND

The U.S. market for pet supplies and pet food is enormous, with retail sales of around $49 Billion in 2003 alone. As part of this market, there is an ongoing need for toys for pet dogs (and other pets), and a variety of designs have been produced. For example, some prior dog toy designs involve a twisted or knotted rope, often with frayed ends, that a dog can chew on and fetch. In U.S. Pat. No. 5,215,038 of O'Rourke, a dog chew toy uses a length of composite rope made of strands of sisal and cotton threads, with knots for a dog to chew on. Other dog toys use bone shapes featuring tennis balls, such as the plastic pet toy of U.S. Pat. No. 6,216,240.

Despite the variety of such known toys for pets, there is an ongoing need to produce pet toys that please both pet and owner.

SUMMARY

In accordance with an embodiment of the invention, there is provided a toy for a pet. The toy includes a tube-shaped member comprising at least two layers of soft durable fabric, and comprising tube ends that are unfrayed, wherein at least one of the tube ends is open; and at least one knot formed in the tube-shaped member.

In further, related embodiments, the toy may include a second tube-shaped member comprising at least two layers of soft durable fabric, and comprising second tube ends that are unfrayed; wherein a center of the second tube-shaped member is joined to a center of the tube-shaped member using a center join comprising a second knot. The center join may further comprise double stitching. Each of the tube ends and each of the second tube ends may comprise double stitching close to the edges of each tube end and each second tube end. The tube-shaped member may also comprise a third knot near one of its tube ends, and a fourth knot near the other of its tube ends; and the second tube-shaped member may comprise a fifth knot near one of its second tube ends, and a sixth knot near the other of its second tube ends. The toy may be machine washable; and the soft durable fabric may comprise 100% polyester fleece. The toy may also comprise a ball contained within the tube-shaped member. The ball may be held within the tube-shaped member by respective knots located on opposite sides of the ball; and the tube-shaped member may further comprise another knot near to at least one of the tube ends. The tube-shaped member may also be sock shaped; the tube ends may comprise a closed sock end; and the ball may be held within the tube-shaped member by a double stitch across the tube-shaped member. The soft durable fabric may be treated with a flavoring substance; which may comprise a proteinaceous substance.

In another embodiment according to the invention, there is provided a method of manufacturing a toy for a pet. The method includes forming a tube-shaped member comprising at least two layers of soft durable fabric, and comprising tube ends that are unfrayed, wherein at least one of the tube ends is open; and forming at least one knot in the tube-shaped member.

In further, related embodiments, the method may comprise forming a second tube-shaped member comprising at least two layers of soft durable fabric, and comprising second tube ends that are unfrayed; and joining a center of the second tube-shaped member to a center of the tube-shaped member using a center join comprising a second knot. Double stitching may also be used to form the center join. Double stitching may be formed close to the edges of each of the tube ends and each of the second tube ends. The method may also comprise forming a third knot near one of the tube ends, and a fourth knot near the other of the tube ends; and forming a fifth knot near one of the second tube ends, and a sixth knot near the other of the second tube ends. The toy may be machine washable; and the soft durable fabric may comprise 100% polyester fleece. The tube-shaped member may also be formed to contain a ball; respective knots may be formed on opposite sides of the ball; and another knot may be formed near to at least one of the tube ends. The tube-shaped member may also be sock shaped. The method may further comprise forming the tube ends to comprise a closed sock end; and a double stitch may be formed across the tube-shaped member to hold the ball within the tube-shaped member. The soft durable fabric may be treated with a flavoring substance, which may comprise a proteinaceous substance.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In accordance with an embodiment of the invention, there is provided a pet toy made of soft durable fabric, which has the advantage of being machine washable, as well as being soft on furniture and attractive for a pet to play with and sleep with. It also has a durable construction of its ends and knots that stands up to repeated chewing and tugging.

A description of preferred embodiments of the invention follows.

Figure 1:
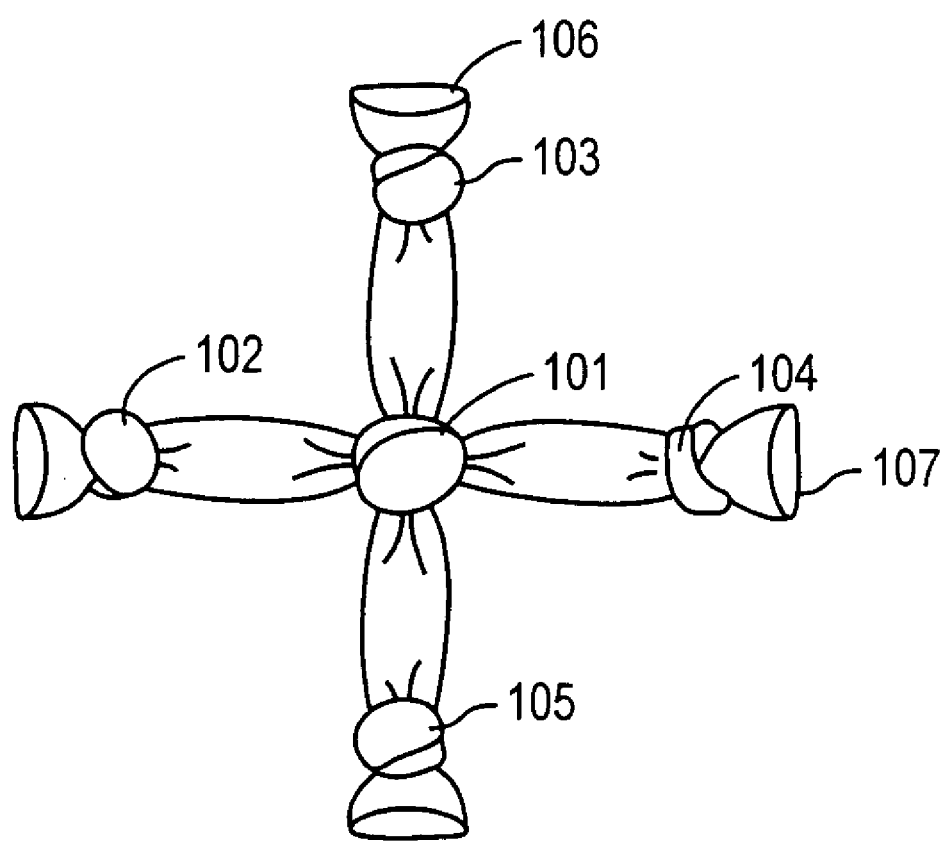
FIG. 1 shows a first embodiment of the invention, in which a pair of double layered, double stitched tube-shaped members of soft durable fabric are crossed, and knotted and stitched together in a central knot; and knotted near to each of the four ends of the crossed tube-shaped members.

FIG. 1 shows a first embodiment of the invention, in which a pair of double-layered, double-stitched tube-shaped members of soft durable fabric 106, 107 are crossed, and knotted and stitched together in a central knot 101; and knotted near to each of the four ends 102–105 of the crossed tube-shaped members. In one embodiment, the soft durable fabric tube-shaped members 106, 107 are made of 100% polyester fleece, which is machine washable.

Figure 2A:
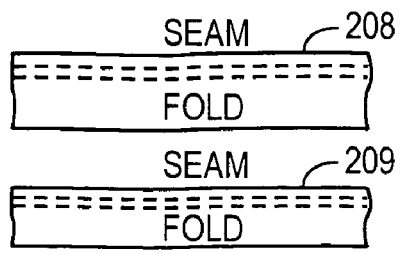
FIGS. 2A–2G show a technique of manufacturing the toy of FIG. 1, in accordance with an embodiment of the invention.
Figure 2B:
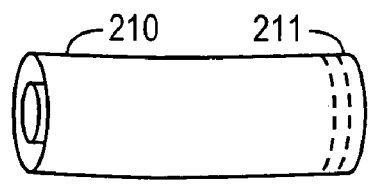
Figure 2C:
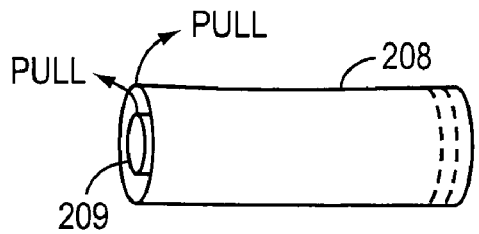
Figure 2D:
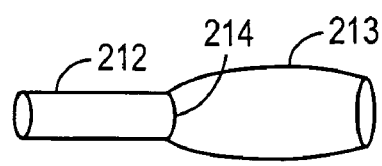

FIGS. 2A–2G show a technique of manufacturing the toy of FIG. 1, in accordance with an embodiment of the invention. To form each of the tube-shaped members 106, 107 of FIG. 1, two rectangles are cut from 100% polyester fleece fabric, folded, and double-stitched along the long edges. One of the rectangles should be of slightly larger width than the other; for example, one rectangle may be 8" by 36", while the other is 7" by 36", before folding. The result is a 4" diameter outer tube-shaped member 208, shown in FIG. 2A, and a 3.5" diameter inner tube-shaped member 209. The inner tube-shaped member 209 is turned right-side out, so that the seam is on the inside, while the outer tube-shaped member 208 is wrong-side out. The inner tube-shaped member 209 is then threaded through the outer tube-shaped member 208 to produce a double layered tube-shaped member 210, shown in FIG. 2B. The double-layered tube-shaped member 210 is then double stitched together around one of the open ends 211, leaving a half-inch seam. As shown in FIGS. 2C and 2D, the inner tube-shaped member 209 and outer tube-shaped member 208 are then pulled in opposite directions to create a single long tube-shaped member, right-side out, having a narrower portion 212 and a wider portion 213, with a seam 214 in the middle.

Figure 2E:
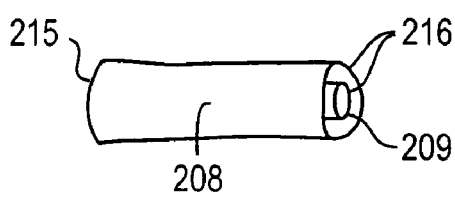
Figure 2F:
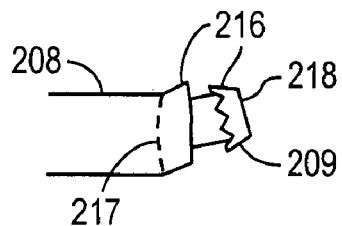
Figure 2G:
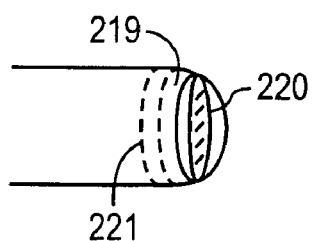

Next, the narrower tube-shaped member 209 is pushed into the wider tube-shaped member 208 to form a double layered tube-shaped member of fabric that has a finished seam on one side 215 and unfinished raw edges of fabric on the other side 216, as shown in FIG. 2E. As shown in FIG. 2F, the unfinished raw edges 216 are then finished by first making a ½" fold 217 on the raw edge of the wider tube-shaped member 208, towards the narrower tube-shaped member 209; and making a ½" fold 218 on the narrower tube-shaped member 209, towards the wider tube-shaped member 208. As shown in FIG. 2G, the creases 219 and 220 of the two folds are then aligned and sewn together with a double stitch 221, close to the edge of the tube-shaped member. The finished seam 215 (in FIG. 2E) is then reinforced by double topstitching. Having double stitching close to the edges of both ends of the tube-shaped member helps the toy to withstand repeated chewing. More generally, having the tube ends be not frayed avoids the tendency of toys with frayed ends to fall apart after much use. The procedure of FIGS. 2A–2G is followed to produce each of the two tube-shaped members 106 and 107 of FIG. 1, resulting in two double layered tube-shaped members of soft durable fabric 106 and 107 with double stitched ends.

Figure 3A:
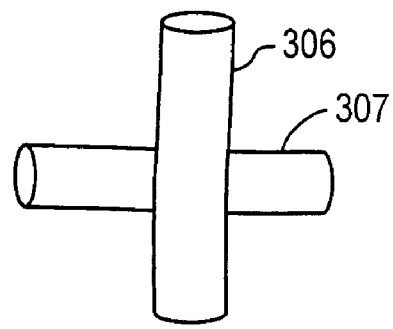
FIGS. 3A–3D show a technique of joining the tube-shaped members produced in FIGS. 2A–2G to assemble the toy of FIG. 1, in accordance with an embodiment of the invention.
Figure 3B:
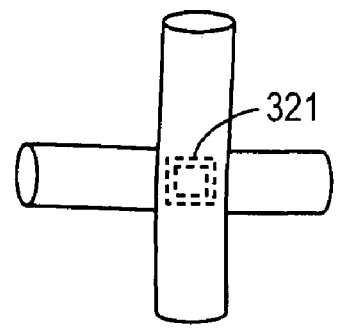
Figure 3C:
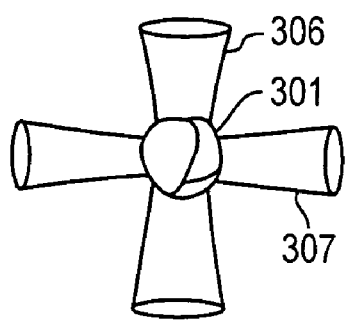
Figure 3D:
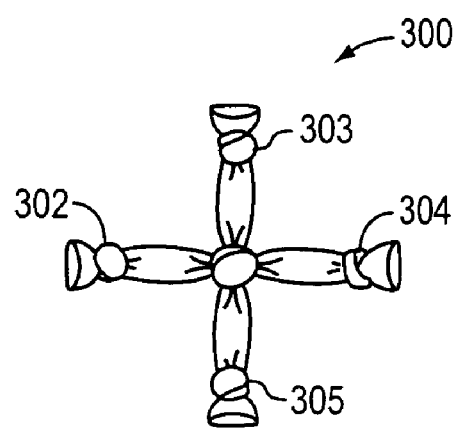

FIGS. 3A–3D show a technique of joining the tube-shaped members produced in FIGS. 2A–2G to assemble the toy of FIG. 1, in accordance with an embodiment of the invention. In FIG. 3A, the soft durable fabric tube-shaped members 306 and 307 are crossed; and in FIG. 3B, they are joined at their centers by a double stitch 321 at the center join. The double stitch 321 helps the finished toy to resist being pulled apart when tugged by two of the perpendicular arms of the toy at the same time. In FIG. 3C, a central knot 301 is formed to reinforce the center join by first tying the ends of one of the tube-shaped members 306 and 307 in an overhand knot around the other tube-shaped member; and then tying an overhand knot in the other tube-shaped member around the first overhand knot. In FIG. 3D, an overhand knot is tied at each of the four ends 302–305, to produce the finished toy 300. The final length of each tube-shaped member may be, for example, 16".

Figure 4:
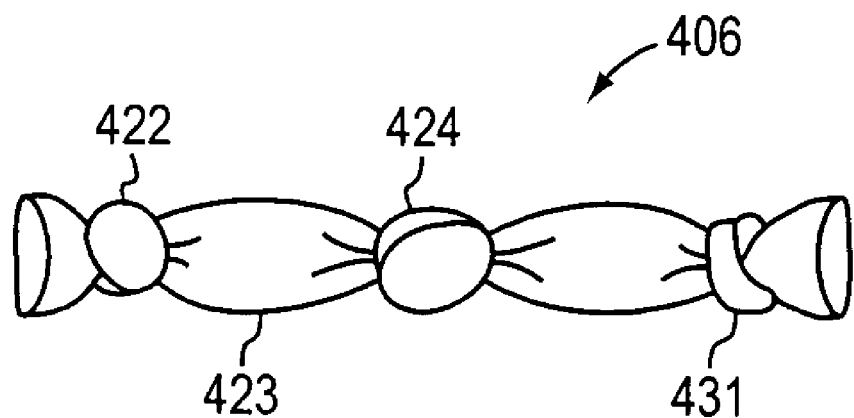
FIG. 4 shows a double layered, soft durable fabric toy that is advantageous for playing catch with a pet, in accordance with an embodiment of the invention.

FIG. 4 shows a double layered, soft durable fabric toy that is advantageous for playing catch with a pet, in accordance with an embodiment of the invention. The embodiment of FIG. 4 is formed by first making a double layered, double stitched tube-shaped member of soft durable fabric 406, in a similar fashion to that described in FIGS. 2A–2G. A first overhand knot 422 is then tied near to one end of the tube-shaped member 406; and a tennis ball 423 is pushed through the open end of the tube-shaped member 406, along the inside of the tube-shaped member 406, and up to the knot 422. A second overhand knot 424 is tied on the other side of the tennis ball 423 to hold it in place inside the tube-shaped member 406; and a third overhand knot 431 is tied near the open end of the tube-shaped member 406. The resulting toy of FIG. 4 is advantageous for throwing, and provides a different texture from that of the toy of FIG. 1, for a dog (or other pet) to chew on. The final length may be, for example, 17".

Figure 5:
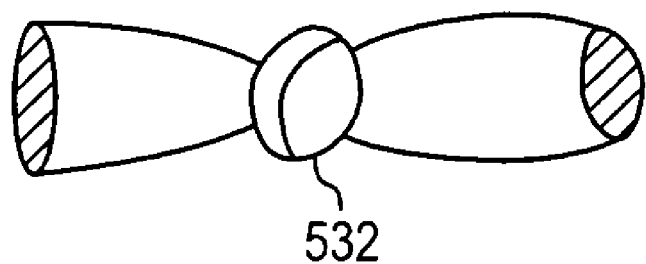
FIG. 5 shows a double layered, soft durable fabric toy in accordance with an embodiment of the invention that is advantageous for playing with puppies or smaller breed dogs (or other small pets).

FIG. 5 shows a double-layered, soft durable fabric toy in accordance with an embodiment of the invention that is advantageous for playing with puppies or smaller breed dogs (or other small pets). The toy is formed by first making a double layered, double stitched tube-shaped member of soft durable fabric, in a similar fashion to that described in FIGS. 2A–2G, except starting with a smaller rectangle of fabric in the step described with reference to FIG. 2A; for example, a 7.5" by 18" rectangle. A shorter double layered tube-shaped member with finished ends is formed; and an overhand knot 532 is tied in the center of the tube-shaped member. The final length of the toy may be, for example, 10".

Figure 6A:
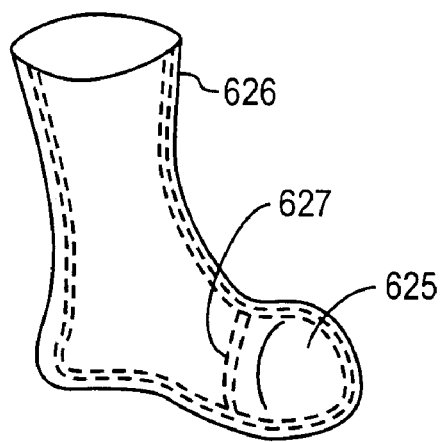
FIGS. 6A–6C show a technique for manufacturing a soft durable fabric toy in the shape of a sock, in accordance with an embodiment of the invention.
Figure 6B:
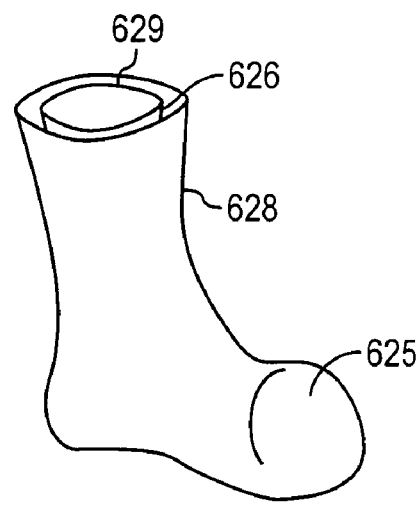
Figure 6C:
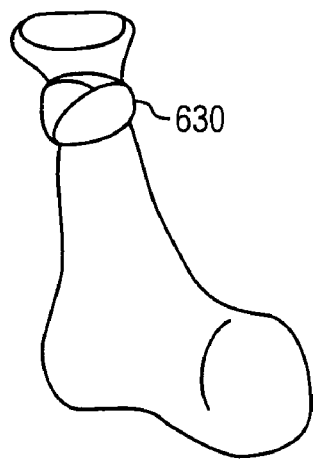

FIGS. 6A–6C show a technique for manufacturing a soft durable fabric toy in the shape of a sock, in accordance with an embodiment of the invention. In this embodiment, the tube-shaped member has one tube end that is an open sock end, and another tube end that is a closed sock end. To manufacture this embodiment, first, two identical sock shapes are cut from two layers of soft durable fabric, such as polyester fleece. These shapes are double-stitched along the edges, leaving a ½" seam, and the top of the sock open. This produces an inner layer for the sock. The same procedure is followed to produce an outer layer of the sock, except with the dimensions of the outer layer being ¼" bigger all around. Next, as shown in FIG. 6A, a tennis ball 625 is pushed into the toe of the inner layer 626 of the sock; and a double stitch 627 is sewn across the middle of the foot of the sock to hold the ball 625 in place. The outer layer 628 of the sock is turned right side out, and the inner layer 626 with tennis ball 625 inside is pushed into the outer layer 628 until the layers align. This produces a two layered sock with a ball in the toe, and a raw edge 629, as shown in FIG. 6B. The raw edge 629 is then finished, in a similar manner to that described with reference to FIG. 2F, by folding the top of inner layer 626 about ½" towards the outer layer 628, and folding the top of outer layer 628 about ½" towards the inner layer 626, and double stitching the two layers together. Next, as shown in FIG. 6C, an overhand knot 630 is tied near the top of the sock. The final length of the toy may be, for example, 16".

While this invention has been particularly shown and described with references to preferred embodiments thereof, it will be understood by those skilled in the art that various changes in form and details may be made therein without departing from the scope of the invention encompassed by the appended claims. For example, a variety of different types of knots, stitches, dimensions, fabric textures, and fabric designs may be used. In addition to fleece, other soft durable fabrics such as wool, cotton, flannel, or others may be used. In order to make the toy attractive to a dog (or other pet), the fabric may be treated with a variety of different flavoring substances; for example, proteinaceous substances. Various types of balls may be used instead of a tennis ball; such as any bouncing rubber ball. Another type of toy item may be used instead of a ball; such as a bell or other noise-making object. Also, to make the toy attractive looking, a variety of different colorful patterns may be applied to the fabric; for example, a tie-dye pattern. Other variations may be made, without departing from the scope of the appended claims.

What is claimed is:

1. A toy for a pet, the toy comprising:
   a tube-shaped member comprising at least two layers of soft durable fabric, and comprising tube ends that are unfrayed, wherein at least one of the tube ends is open;
   at least one knot formed in the tube-shaped member; and
   a second tube-shaped member comprising at least two layers of soft durable fabric, and comprising second tube ends that are unfrayed;
   wherein a center of the second tube-shaped member is joined to a center of the tube-shaped member using a center join comprising a second knot.

2. A toy according to claim 1, wherein the center join further comprises double stitching.

3. A toy according to claim 1, wherein each of the tube ends and each of the second tube ends comprise double stitching close to the edges of each tube end and each second tube end.

4. A toy according to claim 1, wherein the tube-shaped member comprises a third knot near one of its tube ends, and a fourth knot near the other of its tube ends; and wherein the second tube-shaped member comprises a fifth knot near one of its second tube ends, and a sixth knot near the other of its second tube ends.

5. A toy according to claim 1, wherein the toy is machine washable.

6. A toy according to claim 5, wherein the soft durable fabric comprises 100% polyester fleece.

7. A toy according to claim 1, wherein the soft durable fabric is treated with a flavoring substance.

8. A toy according to claim 1, wherein the flavoring substance comprises a proteinaceous substance.

9. A method of manufacturing a toy for a pet, the method comprising:
   forming a tube-shaped member comprising at least two layers of soft durable fabric, and comprising tube ends that are unfrayed, wherein at least one of the tube ends is open;
   forming at least one knot in the tube-shaped member;
   forming a second tube-shaped member comprising at least two layers of soft durable fabric, and comprising second tube ends that are unfrayed; and
   joining a center of the second tube-shaped member to a center of the tube-shaped member using a center join comprising a second knot.

10. A method according to claim 9, further comprising: using double stitching to form the center join.

11. A method according to claim 9, further comprising: forming double stitching close to the edges of each of the tube ends and each of the second tube ends.

12. A method according to claim 9, further comprising:
    forming a third knot near one of the tube ends, and a fourth knot near the other of the tube ends; and
    forming a fifth knot near one of the second tube ends, and a sixth knot near the other of the second tube ends.

13. A method according to claim 9, wherein the toy is machine washable.

14. A method according to claim 13, wherein the soft durable fabric comprises 100% polyester fleece.

15. A method according to claim 9, further comprising treating the soft durable fabric with a flavoring substance.

16. A method according to claim 15, wherein the flavoring substance comprises a proteinaceous substance.

* * * * *